March 20, 1962    H. KRAUSE    3,026,131
SELF ADJUSTING DUAL LATCH
Filed Nov. 19, 1958    2 Sheets-Sheet 1
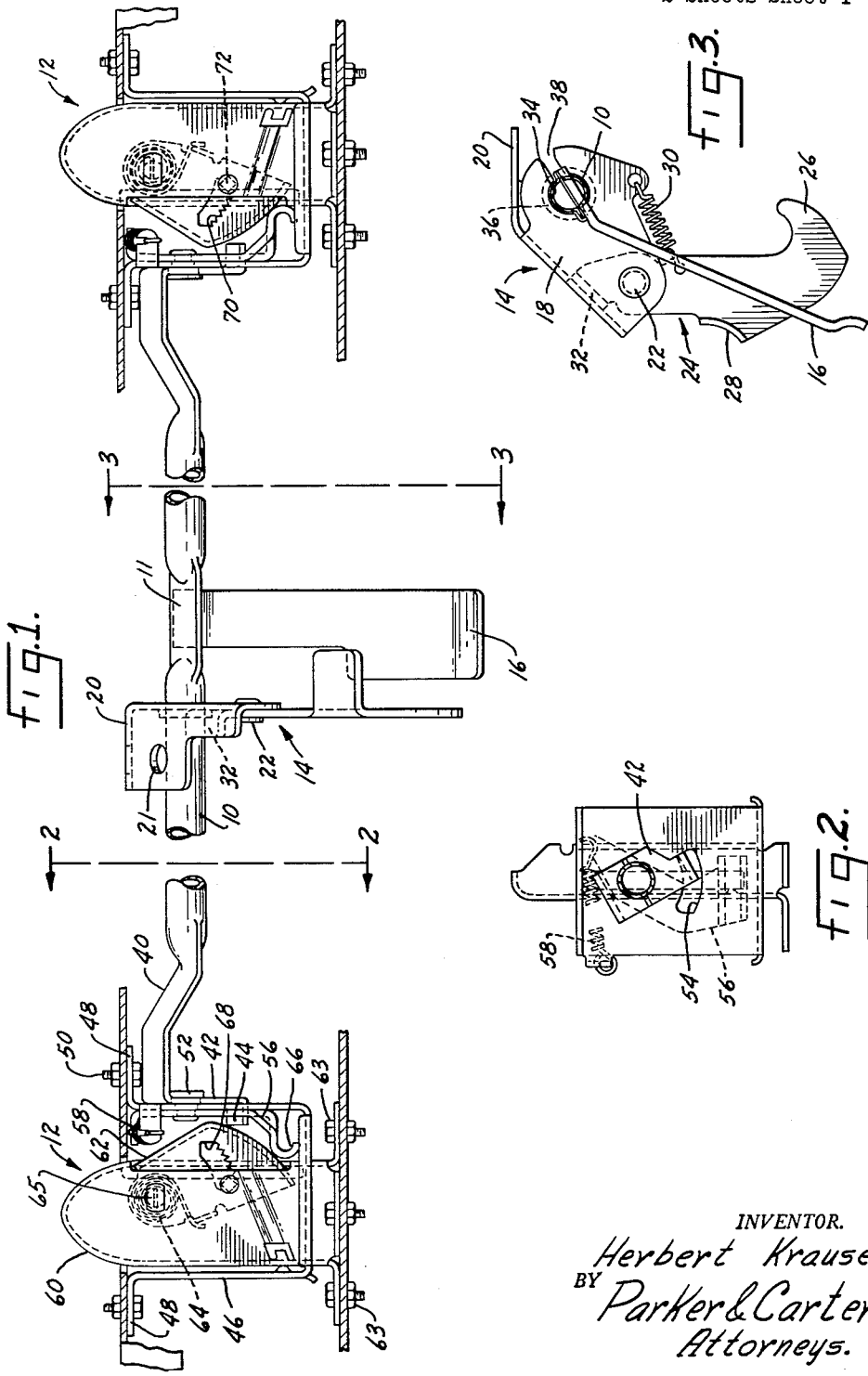
INVENTOR.
Herbert Krause,
BY Parker&Carter
Attorneys.

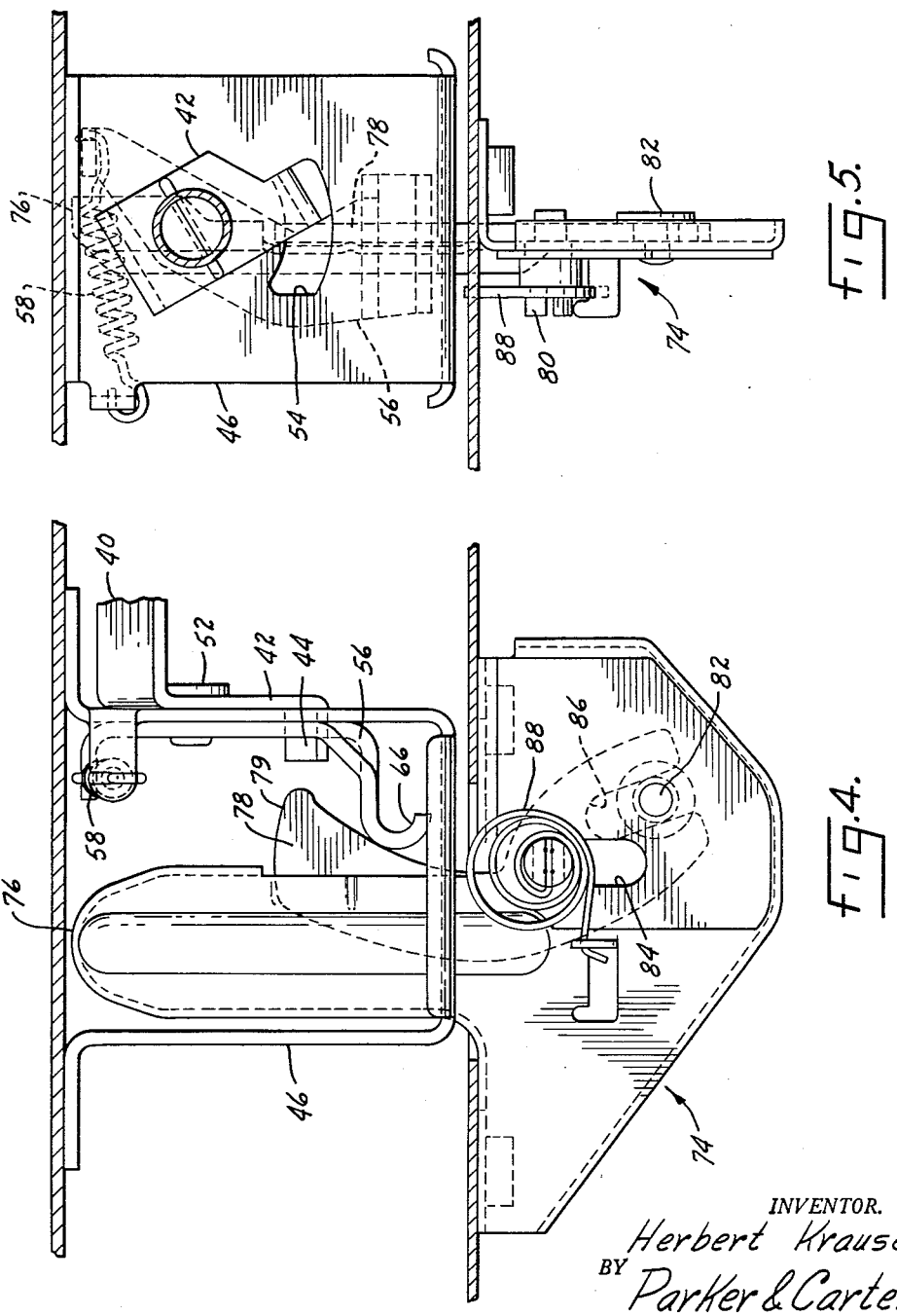

United States Patent Office 3,026,131
Patented Mar. 20, 1962

3,026,131
SELF ADJUSTING DUAL LATCH
Herbert Krause, Chicago, Ill., assignor to Chicago Forging and Manufacturing Company, Chicago, Ill., a corporation of Delaware
Filed Nov. 19, 1958, Ser. No. 775,006
6 Claims. (Cl. 292—11)

This invention relates to latching structures for securing hood closures of automobiles or the like and has for one purpose to provide an improved hood latch for an alligator type hood closure.

Another purpose is to provide a hood latching structure wherein a plurality of latching mechanisms and a safety latch are operated by a single actuating handle.

Another purpose is to provide an improved latching mechanism for use with a hood latching structure employing a rotatable elongated bar as the operating means.

Another purpose is to provide a hood latching structure that can rapidly be assembled on an automobile assembly line.

Another purpose is to provide a hood latching structure that will securely fasten a hood closure to the body of an automobile.

Another purpose is to provide a hood latching structure that is self adjusting.

Another purpose is to provide a hood latching structure that can be attached either to the body or the hood closure of an automobile.

Another purpose is to provide a hood latching structure that will compensate for minor variations in spacing between the hood closure and body of the automobile.

Other purposes will be apparent from the ensuing specification, drawings and claims.

The invention is illustrated diagrammatically in the following drawings wherein:

FIGURE 1 is a front view of a hood latching structure,

FIGURE 2 is a side view of a latching mechanism taken along the line 2—2 of FIGURE 1, FIGURE 3 is a side view of a safety latch taken along the line 3—3 of FIGURE 1, FIGURE 4 is a front view of an alternative form of latching mechanism, and FIGURE 5 is a side view of the latching mechanism of FIGURE 4.

Referring to the drawings, and particularly to FIGURE 1, a rotatable elongated hollow tube or bar 10 is operably connected to a pair of spaced latching mechanisms indicated generally at 12. A manual actuating handle 16 is attached to the bar 10 between the mechanisms 12, movement of the handle rotating the bar and also rotating a safety latch indicated generally at 14.

Referring more particularly to FIGURE 3, the safety latch includes a safety latch plate 18, a portion of which, indicated at 20 is perpendicular to the plate 18 and has been formed into a mounting plate for the safety latch. The mounting plate 20 has suitable holes or apertures 21 for mounting the safety latch to either the hood closure or body of an automobile. Pivotally mounted, as at 22, to the safety latch plate 18 is a safety hook member indicated generally at 24, the lower portion of which has a hook 26 projecting outwardly therefrom. A projection 28 extending laterally from the safety hook member overlies the path of rotation of the manual actuating handle 16. A suitable spring or other yielding means 30 is connected between the safety hook member and the safety latch plate and biases the safety hook member so that stop tab 32, projecting laterally from the top of the safety hook member, firmly abuts the mounting plate 20.

The upper portion of the manual actuating handle 16 is suitably secured to a flat portion 11 of the rotatable elongated tube 10. A suitable hole or aperture 34 in the upper part of plate 18 is adapted to receive the bar 10, a bearing surface or sleeve 36 on one side of the plate providing a smooth surface for rotation of the bar. A slot 38 bisecting the aperture 34 provides means for installing the elongated bar 10, the flattened portion 11 of the bar being slid into the slot 38 after which the bar may be moved laterally until the flattened portion is displaced to one side of the safety hook.

Each end of the rotatable elongated hollow bar 10 has an angularly offset end portion, indicated generally at 40, which terminates in a portion 42, perpendicular to the axis of rotation of the bar, and an actuating lug 44 parallel to the axis of rotation of the bar, the lugs being adapted to release a latching mechanism hereinafter described.

Referring now to FIGURES 1 and 2, the latching mechanisms 12 each comprise a generally U-shaped latching plate 46 having mounting plates 48 and mounting means 50 which are used for mounting the latching mechanism to a tie bar or brace on the body or hood closure of an automobile. The portion 42 of the bar 10 is pivotally mounted at 52 by a suitable pin or rivet to the latching plate 46 so that the actuating lug 44 projects through an arcuate slot or aperture 54 on the side of the latch plate. Also mounted on the pivot point 52 is a first latch member 56, one edge of which abuts the actuating lug 44, the first latch member being adapted to rotate in response to movement to the actuating lug. It should be noted that the axis of rotation of the first latch member is the same as the axis of rotation of the elongated bar 10. A spring or other suitable yielding means 58 biases or forces the first latch member against the actuating lug 44.

A keeper structure 60 is shown received within the latch plate 46. Projecting outwardly from one side of the keeper 60 is a second latch member 62 which is pivotally mounted on the keeper and biased by means of a spring 64, the spring biasing or forcing the second latch member outwardly from the keeper structure and toward the center of the latching structure. The second latch member may have an elongated aperture (not shown) for pivotal mounting on the keeper by a suitable pivot member 65, the pivot member having a slotted end for anchoring spring 64. The keeper may be mounted by bolt means 63 to a tie bar or brace on the body or hood closure of the automobile. The keeper is prevented from moving downwardly and out of the U-shaped latch plate by means of a projection or extension 66 projecting outwardly from the side of the first latch member 56, and toward the center of the U-shaped latch plate. The projection 66 abuts the second latch member 62.

An arcuate slot or aperture 68, the bottom edge of which has a series of teeth 70, has been formed in the second latch member 62. This slot and the projecting teeth cooperate with a bar 72, which projects outwardly from the keeper structure and into the slot, to form a means of locking or securing the second latch member in any one position. As clearly seen in FIGURE 1, each of the teeth are at a different height, so that if the hood closure of the automobile should become vertically misaligned the keeper can still be secured in the latch plate. If for some reason the keeper should not be able to be received completely within the latch plate, nevertheless the keeper would be secured within the plate as the locking bar 72 can be engaged in any one of the grooves formed by the teeth 70. This provides a self adjusting feature and allows for variations in the spacing between the hood closure and the body of the automobile.

A modified form of keeper structure is shown in FIGURES 4 and 5. This form of keeper structure is also adaptable to be used with a U-shaped latch plate and a rotatable elongated bar as hereinbefore described. A keeper structure indicated generally at 74 comprises an elongated keeper 76 projecting into the U-shaped latch plate 46, and a second latch member 78 projecting outwardly from one side of the keeper 76. The second latch member 78 is slidably mounted by means of pins 80, 82, and slots 84, 86. This arrangement of a vertical slot and an angularly offset slot makes it possible for a vertical force on end 79 of the second latch member 78 to move the latch member both inwardly and downwardly on the keeper 76. A vertical force applied to the end 79 will cause the second latch member to move downwardly on the keeper as pin 80 moves in slot 84, while at the same time, slot 86 in the second latch member moves downwardly and outwardly on pin 82, which forces the second latch member inwardly of keeper 76. A spring 88 or other suitable yielding means biases the second latch member 78 upwardly and outwardly from the keeper 76. The force applied to end 79 forces the latch member to move against the action of the spring.

The use, operation, and function of the invention is as follows:

As the automobile industry has progressed to wider automobiles, it has been an increasing problem to provide a suitable hood latching arrangement for the wider hoods on these automobiles. Because of the wider hoods, it has become desirable to have a hood latching structure that secures the sides of the hood closure to the automobile. Accordingly a hood latch constructed in accordance with this invention provides a pair of spaced latching mechanisms and a safety latch interposed between the spaced latching mechanisms.

It has also been found that due to slight variations in construction of automobiles, the mounting brackets for hood latches will vary slightly in their relation to each other. Accordingly, another important feature of this invention is a means for compensating for such small variations in hood latch mounting brackets. The self-adjusting feature of the invention makes it possible to securely fasten a keeper in a latching structure even though the keeper might not be received to its fullest extent within the latching structure.

Another feature of this invention is a safety latch which is operated by the same handle or actuating arm that operates the main latching mechanisms. In the invention as disclosed herein, one actuating arm operates both the safety latch and the spaced primary latches.

In securing the hood with a latching structure such as described herein, the operator moves the hood closure downward until the projecting part of the safety hook 26 contacts the tie bar or other suitable projection which is designed to arrest its upward movement. As the hood continues downward, the upwardly slanting edge of the safety hook forces the hook in a clockwise direction against the action of the spring 30. Once the safety hook as progressed beyond the tie bar, the action on the spring 30 moves the hook in a counterclockwise direction until the tie bar overlies its upward path. The hood is now partially secured, and cannot be opened unless the safety hook is rotated.

As the hood is moved downward the keeper enters the U-shaped latch 46, the projecting portion 66 of the first latch member contacting the upper edge of the second latch member 62 and forcing the second latch member inwardly against the action of the spring 64. The second latch member is forced inward until the first latch member has passed beyond the upper edge, at which point the action of spring 64 forces the second latch member outwardly, or counterclockwise as shown on the drawings, until the bar 72 is caught in one of the grooves formed by teeth 70.

The keeper is now securely held in the U-shaped latch plate. The projecting part 66 of the first latch member 56 is firmly forced against the second latch member, and holds the teeth firmly against the projecting block 72 so that there is no possible movement of the second latch member. Movement in an inward direction is stopped by the bar, and movement in the outward direction is stopped by the projecting part 66. In order for the keeper to become dislodged or unlocked from the latch plate, the second latch member must be forced inward, and this is not possible as long as the pin is in a groove and the projecting part 66 is underneath the second latch member.

It should be noted that there is an allowance for the variation in the distance between tie bars to which both the keeper and the latch plate are mounted. For example, if these two members are unduly spaced apart, the keeper will not be completely received within the U-shaped latch plate. However, such a slight variation will not cause any difficulty in securing the hood to the body of the automobile as the arcuate slot 68, which curves upwardly, provides a means for locking the second latch member even though the keeper is not completely received within the U-shaped latch plate.

In order to release the hood from the body of the automobile, the actuating handle 16 is rotated in a clockwise direction until the handle contacts projecting part 28 of the safety hook. Continued rotation of the handle moves the safety hook around the tie bar or other projection overlying the path of the safety hook. As the handle is rotated, the elongated bar also is rotated in a clockwise direction, rotation of the bar moving the actuating lug 44 in the arcuate slot 54, which in turn rotates the first latch member 56 on pivot 52. The first latch member is rotated until it is no longer beneath the second latch member, this permitting the action of spring 64 to disengage locking block 72 and release the second latch member. The hood closure may now be pulled upward until the keeper is completely out of the U-shaped latch plate.

When using the form of keeper shown in FIGURES 4 and 5, the operation of the latching structure is generally similar except that as the hood closure is moved downward and the keeper moves into the U-shaped latch plate the projecting part 66 contacts the end 79 of the second latch member 78, and through the action of the slots and pins hereinbefore described, the second latch member is moved both inwardly and downwardly of the keeper 76. As soon as the projecting part 66 has moved past the top edge of the second latch member the action of the spring 88 will force the second latch member up and out. The projecting part 66 is then underneath the lower curved edge of the second latch member which prevents the latch from opening. The self-adusting feature described on the other form of keeper also is present in this form of keeper structure. For example, as long as the projecting part 66 is underneath any part of the lower edge of the second latch member the latch cannot become undone. This again provides for minor variations in the construction of the automobile.

The hood latch is unlocked in the same manner described above, rotation of the bar causing rotation of the projecting part 66 until it is no longer underneath the second latch member, at which point the keeper can be removed from the U-shaped latch plate.

Of particular not in the invention is the bearing sleeve or the bearing surface provided in the safety latch for smooth rotation of the bar 10. Also, the flattened section 11 of the bar 10 which provides for easy assembly of the safety latch structure. The flattened portion is slid into the bisecting slot 38 and the bar is moved transversely to the body of the automobile until the ends of the bar are operably engaged with the spaced latching mechanisms. Also the axis of rotation of the first latch member is coaxial with the axis of rotation of the bar 10, which provides a stronger more durable structure with less strain on the bar.

It should be understood that whereas the invention has been described as employing the keeper mounted on the body of the automobile and the latch plate mounted on the hood closure, the reverse construction operates with equally satisfactory results.

As there are many variations, alterations, and substitutions possible without departing from the essential theme of the invention, the invention should only be limited by the following claims:

I claim:

1. A latching structure including a pair of spaced latching mechanisms, a rotatable elongated bar having angularly offset end portions operably engaged with each of said latching mechanisms, each of said spaced latching mechanisms including a latch plate, a first latch member rotatably mounted on said latch plate and having a portion thereof in contact with said angularly offset end portion so that said first latch member will rotate upon movement of said bar, a keeper positioned to be lockingly engaged in said latch plate, a second latch member movably mounted on said keeper and projecting outwardly therefrom, said second latch member being positioned to contact said first latch member when said keeper is positioned within said latch plate so that said first and second latch members cooperate to secure said keeper structure in said latch plate, movement of said first latch member being effective to release said keeper and an actuating member mounted on and adapted to rotate said bar.

2. The structure of claim 1 characterized by and including a support positioned between said plates, an aperture in said support, an outwardly open slot bisecting said aperture, said bar having an intermediate portion formed and adapted to enter said slot, said aperture defining a bearing surface for said bar.

3. The structure of claim 1 characterized by and including a safety hook rotatably mounted adjacent said bar and intermediate the ends thereof, said safety hook having a projection in the path of said actuating member whereby rotation of said actuating member is effective to rotate said bar and said safety hook.

4. The structure of claim 1 wherein said second latch member is rotatably mounted on said keeper and rotates inwardly upon contact with said first latch member during insertion of the keeper into the latch plate.

5. The structure of claim 1 wherein said second latch member is slidably mounted on said keeper and moves inwardly and longitudinally of said keeper upon contact with said first latch member during insertion of the keeper into the latch plate.

6. A latching mechanism for use in a latching structure including a latch plate, a first latch member rotatably mounted on said latch plate, means for rotating said first latch member, a keeper positioned to be lockingly engaged in said latch plate through contact with said first latch member, a second latch member slidably mounted on said keeper and projecting outwardly therefrom, said second latch member sliding inwardly and longitudinally of said keeper upon contact with said first latch member during insertion of the keeper into the latch plate, said first latch member and said second latch member cooperating to secure said keeper in said latch plate after insertion of said keeper into said latch plate, an elongated slot in said keeper, a pin on said second latch member positioned to move in said slot, an elongated slot in said second latch member angularly offset from the slot in said keeper and a pin on said keeper positioned for relative movement in said second-named slot, said slot structure formed and adapted to allow said second latch member to slide into the keeper upon insertion of the keeper into the plate.

References Cited in the file of this patent

UNITED STATES PATENTS

| | | |
|---|---|---|
| 2,275,740 | De Orlow | Mar. 10, 1942 |
| 2,285,301 | Nelson | June 2, 1942 |
| 2,312,578 | Northrup et al. | Mar. 2, 1943 |
| 2,561,496 | Cicero | July 24, 1951 |
| 2,620,889 | McCormick | Dec. 9, 1952 |
| 2,790,668 | Friedman et al. | Apr. 30, 1957 |
| 2,797,116 | Jaster | June 25, 1957 |
| 2,841,430 | Krause | July 1, 1958 |
| 2,877,035 | Claud-Mantle | Mar. 10, 1959 |
| 2,917,335 | Pyka | Dec. 15, 1959 |
| 2,926,942 | Krause et al. | Mar. 1, 1960 |